United States Patent [19]

Richard

[11] 4,010,441

[45] Mar. 1, 1977

[54] FLEXION-PLATE HYDROPHONES

[75] Inventor: Jeanne-Marie Monique Richard, Sanary-sur-Mer, France

[73] Assignee: Etat Francais, France

[22] Filed: Mar. 5, 1975

[21] Appl. No.: 555,592

[30] Foreign Application Priority Data

Mar. 5, 1974 France .......................... 74.07351

[52] U.S. Cl. ................................ 340/10; 310/8.6; 340/13 R

[51] Int. Cl.[2] ...................................... H04B 13/00

[58] Field of Search .............. 340/8 R, 8 PC, 9, 10, 340/12 R, 13 R, 14; 310/8.5, 8.6, 9.1

[56] References Cited

UNITED STATES PATENTS

| | | | |
|---|---|---|---|
| 2,448,365 | 8/1948 | Gillespie | 340/10 |
| 3,054,084 | 9/1962 | Parssinen et al. | 340/8 R |
| 3,166,730 | 1/1965 | Brown, Jr. et al. | 340/10 |
| 3,202,962 | 8/1965 | Elston | 340/10 |
| 3,252,016 | 5/1966 | Hayer, Jr. et al. | 310/9.1 X |
| 3,255,431 | 6/1966 | Howatt | 340/10 |
| 3,573,394 | 4/1971 | Birnbaum | 310/9.1 |
| 3,763,464 | 10/1973 | Laurent | 340/10 |
| 3,832,762 | 12/1973 | Johnston et al. | 340/10 X |

*Primary Examiner*—Harold Tudor
*Attorney, Agent, or Firm*—Stevens, Davis, Miller & Mosher

[57] ABSTRACT

A hydrophone including a flexible membrane which is encased along its periphery within two rings. A piezoelectric disc is placed against each face of the membrane. The membrane, encasement, and discs form a unit which is embedded in an elastomeric material such as polyurethane. The elastomeric material forms a window of reduced thickness facing each disc and provides the sole mechanical connection with a rigid support. The hydrophone has good directivity and good sensitivity over a sound frequency band several KHZ wide.

10 Claims, 6 Drawing Figures

FIG. 1
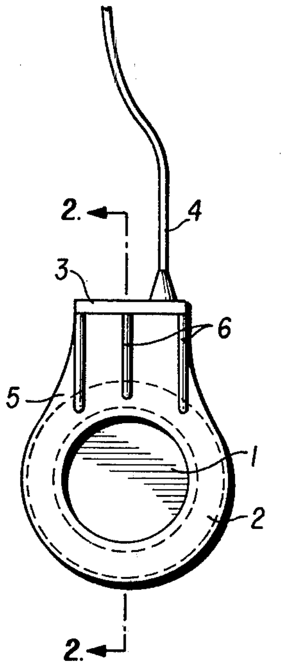
FIG. 2
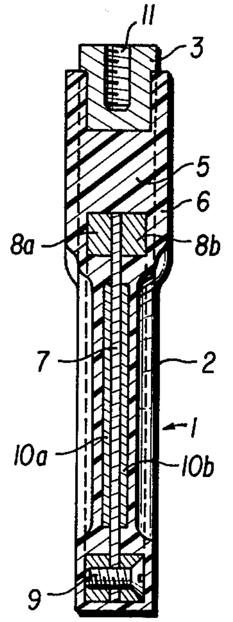
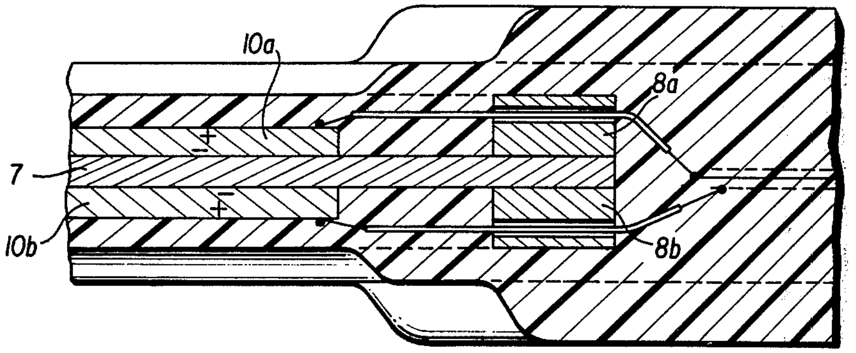
FIG. 3

FLEXION-PLATE HYDROPHONES

The present invention deals with flexion-plate hydrophones, double or triple-plate types, sensitive to a pressure gradient.

The technical aspect of this invention is that of making small volume hydrophones which can be placed in ejectable buoys, which have good sensitivity in a band of low frequencies ranging from 5 to 12 KHZ and which have directivity lobes in the shape of eights designed to reveal the direction of a sound-source.

Biplated and triplated hydrophones are known which comprise a plane, flexible membrane, usually a metallic one, fixed along its periphery. A disc made of piezoelectric material such as lead titanium zirconate is attached to one or both faces of these hydrophones.

In such hydrophones, the membrane vibrates in a flexing movement, under the effect of differences in acoustic pressure which are exerted on both faces, and the piezoelectric discs which stick to the membrane also vibrate in flexion and thus create potential differences.

These hydrophones are known to have good directivity because they are practically insensitive to sound waves travelling in the same plane as the membrane because no pressure difference is produced between its two faces. However, they are sensitive to sound waves travelling perpendicular to the plane of the membrane. In the case of a triplate, it is known that the two piezoelectric ceramics can be mounted, either in series with the two ceramics having opposite polarities, or in parallel, in which case the ceramics would have the same polarity.

One of the objectives of the present invention is to furnish flexion-plate hydrophones, either biplate or triplate, which are conveniently sized and show good sensitivity in a band having a range of several KHZ situation within the sound frequencie for example, between 5 and 12 KHZ.

Another objective is to procure a flexion-plate hydrophone which has good directivity and maintains all of its properties in temperatures ranging between −30° C and +50° C even after a thermal shock.

Another objective of this invention is to furnish a flxion-plate hydrophone whose vibrational unit is protected from any contact with water and can be immersed, and which can withstand large hydrostatic pressures of about 300 bars.

The objectives of the invention are realized by means of a flexion-plate hydrophone made of a flexible membrane encased along its periphery, and to at least one face of which is stuck a piezoelectric disc, and characterized by the fact that the unit which includes the membrane, the discs, and the encasing agents is entirely embedded in an elastomeric material.

The encasing agents are made up, preferably, of two rings with the periphery of the membrane squeezed between them.

In a hydrophone made according to this invention, and attached to a rigid support, the mechanical connection between the support and the hydrophone is constituted only by the elastomeric material mentioned above.

The thickness of the elastomeric material is uniform and reduced on both sides of the membrane and the piezoelectric discs. For example, the thickness can range from 0.5 mm to 2 mm.

In a hydrophone for which the encasing agents have an interior diameter of approximately 24 mm, the reduced thickness of the elastomeric material is around 1 mm. Preferably, the elastomeric material is polyurethane and the piezoelectric discs are ceramics made of lead titanium zirconate.

The end-product of the invention is a new device constituted by a hydrophone of reduced size, having good sensitivity in sound range frequencies, capable of immersion to great depths, and capable of withstanding temperatures below freezing.

Immersible flexion-plate hydrophones, whose flexible membrane and piezoelectric discs are enclosed in a watertight case filled with air or with some liquid such as silicone oil are known.

The inconvenience of having an air-filled case is that this disturbs directivity, and the known hydrophones which feature flexible membranes placed in air-filled cases have very poor directivity, whereas tests performed on hydrophones modeled on the invention, and coated with elastomeric polyurethane rubber, indicate that directivity is very good in the frequency band ranging between 1 KHZ and 30 KHZ.

In some known devices, the flexible membranes are placed in an enclosure which is made watertight by means of a flexible cover, so that the air or the liquid contained within the case has equalized pressure relative to the environment. These devices have the advantage of allowing the assembling of lightweight and small-sized cases since these do not have to resist hydrostatic pressure. In this case, the characteristics of the hydrophones, especially their resonance frequency, may very according to hydrostatic pressure.

The present invention not only ensures the protection of membranes and ceramics from any contact with water because of a device which takes very little space, but also produces characteristics which are hardly altered at all by hydrostatic pressure.

The advantage of embedding the membrane and piezoelectric discs in an elastomeric material is that the sensitivity peak around the resonance frequency is expanded so as to obtain a wider passing band.

The fact that the vibrational unit within the hydrophone is connected to the rigid support exclusively by means of the elastomeric material leads to a proper acoustic decoupling between the vibrational unit and the support, and reduces energy losses by transmission to the support which contributes to the good sensitivity obtained.

The following description refers to the drawings which represent, as a non-limitative example, one manner of realizing a hydrophone according to the invention and the measured results.

FIG. 1 is a front view of a hydrophone according to the invention.

FIG. 2 is a cross-section along II—II of FIG. 1.

FIG. 3 is a cross-section of a detail on a larger scale.

Figure 4:
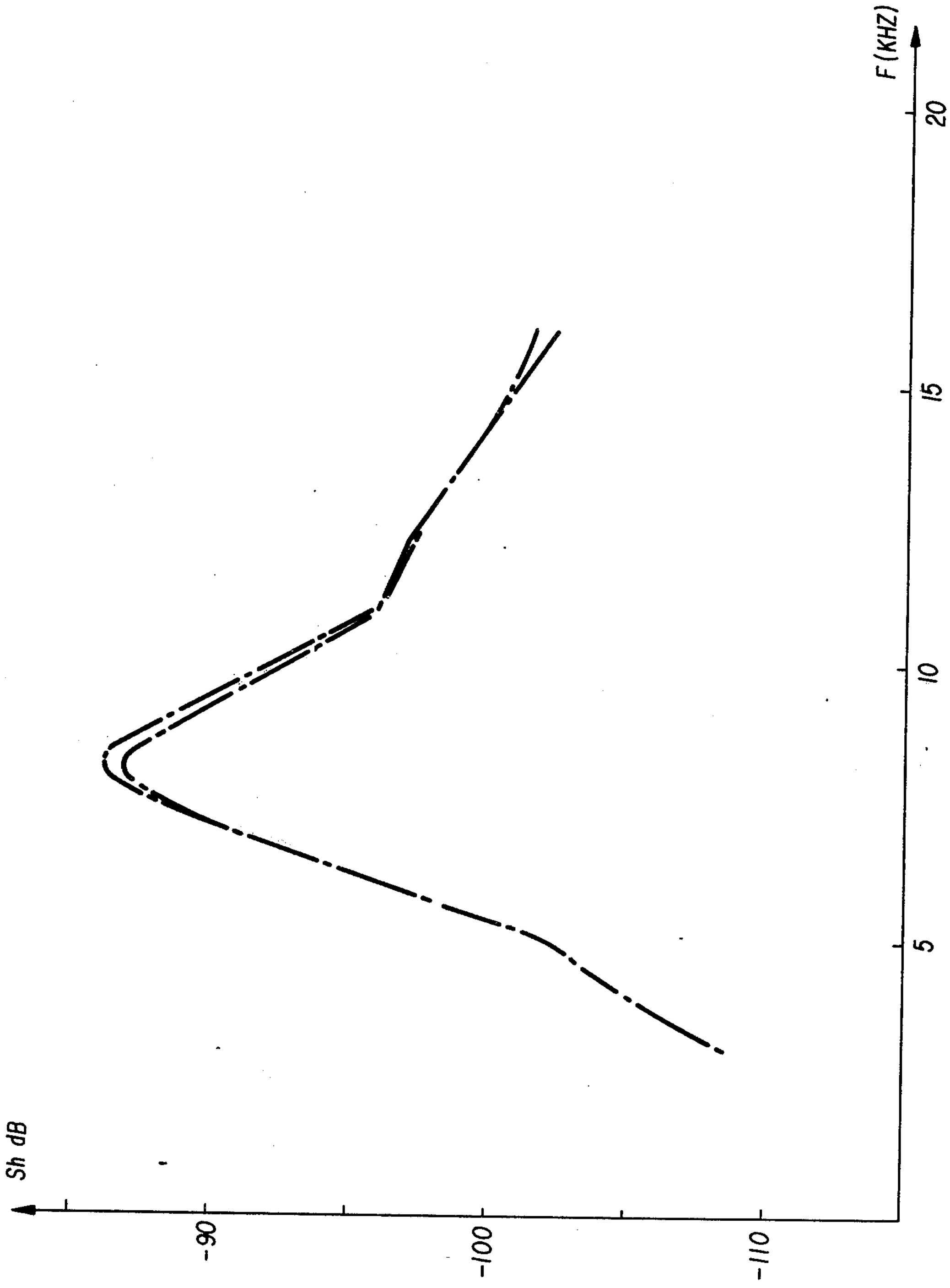
FIG. 4 is a diagram of the sensitivity measured in decibels of a series of hydrophones modeled after the invention.

In FIG. 1 is shown the front view of a hydrophone according to the invention. The hydrophone has a generally circular shape, featuring, in the center, a cicular-shaped window 1 surrounded by a ring-shaped rim 2 which connects the window 1 to a means 3 of fixation upon a rigid support. A cable 4 contains the electric conductors which lead to the electrodes. The hydrophone unit is set in elastomeric polyurethane 5 which forms stiffening ribs 6 in the section connecting the central window 1 to the fixation device 3.

As an example, the dimensions of such a hydrophone are: exterior diameter of the rim 2: 34 mm; over-all length: 46 mm; over-all thickness: 6.5 mm.

In FIG. 2 identical reference numerals have been used to denote the identical parts shown in FIG. 1.

In FIG. 2, the various elements of the hydrophone are shown and include, in the center, a flexible plate 7, constituted by a circular disc made of an aluminum alloy. The disc may be 0.5 mm thick and 32 mm in diameter for example. This membrane is caught between two brass rings or washers 8*a* and 8*b* which are 32 mm in exterior diameter, 24 mm in interior diameter and 2 mm thick.

The two rings 8*a*, 8*b* and the membrane 7 are assembled together by means of six screws 9. Plate 7 is thus encased along its periphery and can vibrate in flexion under the action of the differences in acoustic pressure which are exerted upon its two faces.

Two discs 10*a* and 10*b*, made of piezoelectric ceramic, are glued to the faces of the membrane 7. The discs 10*a*, 10*b* have an exterior diameter smaller than the encasing diameter. For example, the two discs may be made of lead titanium zirconate, 20 mm in diameter and 0.5 mm thick.

The two ceramics 10*a* and 10*b* are of opposite polarity and are connected in series as is shown in FIG. 3.

The plate 7 serves as electrode and, along with the two washers 8*a* and 8*b* reaches a potential half the exit potential of the hydrophone.

It is also contemplated in this invention that the two ceramics can be set up in parallel with the two outside faces being of opposite polarity.

The hydrophone described above is the triplate type: i.e., the membrane and the two ceramics. A biplated hydrophone is also contemplated in this invention using only the flexible membrane 7 and one ceramic 10.

The unit including the flexible plate 7, the piezoelectric ceramic(s) 10 and the encasing devices 8 is drowned in an elastomeric material 5, for example such as polyurethane, which coats the unit. This coating is obtained by placing the vibrational unit is a mold into which the polyurethane is poured. With this coating there are no substantial air pockets in the unit.

Polyurethane, or any equivalent elastomeric matter, transmits acoustic pressure differences and, due to its flexibility, it does not cancel out the flexion vibrations of membrane 7 although it slightly muffles them. This muffling, however, has the advantage of increasing the sensitivity peak around the resonance frequency.

In order that the muffling remains acceptable, a smaller and uniform thickness of polyurethane is provided facing ceramics 10*a* and 10*b*. The thickness may range from 0.5 mm to 1.5 mm and preferably around 1 mm.

This reduced thickness wall constitutes the central window 1 which is surrounded by the circular rim 2 enclosing rings 8*a* and 8*b*.

FIG. 2 shows the fixation means 3 made up of an inserted rigid plate having threaded holes 11 into which fixation screws are screwed.

This means of attachment can be replaced by any equivalent means. As a characteristic of this invention, there is no rigid mechanical connection between the plate 3 and the rings 8*a* and 8*b*. Rather, the plate 3 and rings 8*a*, 8*b* are connected solely by the elastomeric polyurethane which features stiffening ribs to increase its resistance to flexion. This manner of fixation ensures a good acoustic decoupling between the hydrophones and their support. The electric conductors which lead to the ceramics are drowned in polyurethane.

The total weight of the hydrophone described above is aproximately 23 grams, its capacity without the connecting wire is about 3,900 pF and its insulation is 10,000 MΩ

FIG. 4 represents the envelope of sensitivity curves as measured on a number of hydrophones modeled after the invention.

The diagram represents on the Y-axis, the sensitivity in decibels of the relation potential in volts/acoustic pressure in microbars, and on the X-axis the frequency in KHZ. This diagram shows that a sensitivity ranging from −87 db to −86 db is obtained for a resonance frequency of 8 KHZ.

Sensitivity remains greater than −96 db on a frequency band between 6 KHZ and 11 KHZ.

Figure 5:
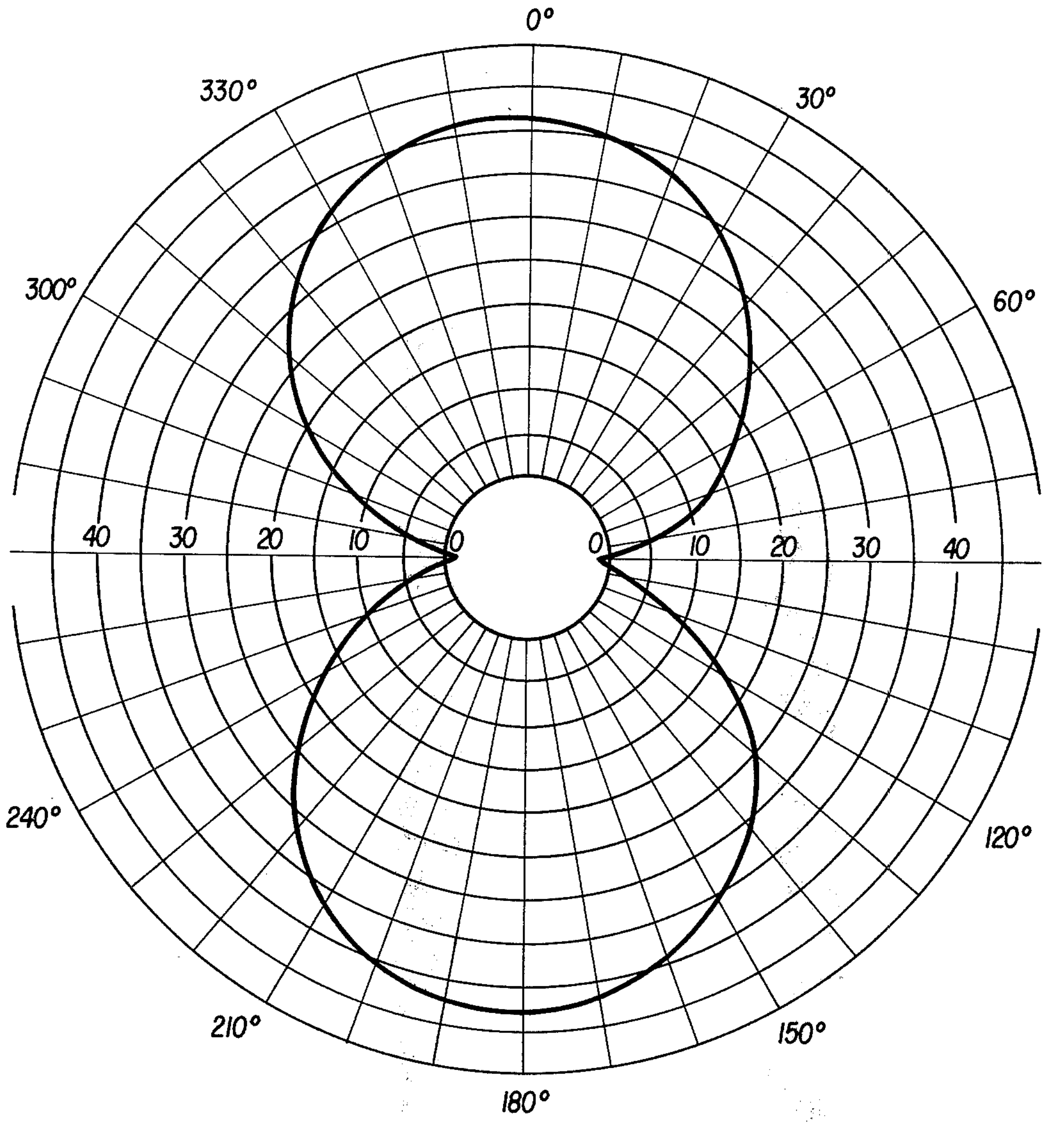
FIG. 5 and 6 represent the directivity lobes of a hydrophone according to the invention, at frequencies of 3.5 KHZ and 30 KHZ.

FIG. 5 represents, for a frequency of 3.5 KHZ, the sensitivity lobes according to the sound source bearing in relation to the axis of the hydrophone (zero bearing corresponding to a source placed in a perpendicular direction to the plate). This diagram gives, for each bearing, the sensitivity measured in volts/barye.

Figure 6:
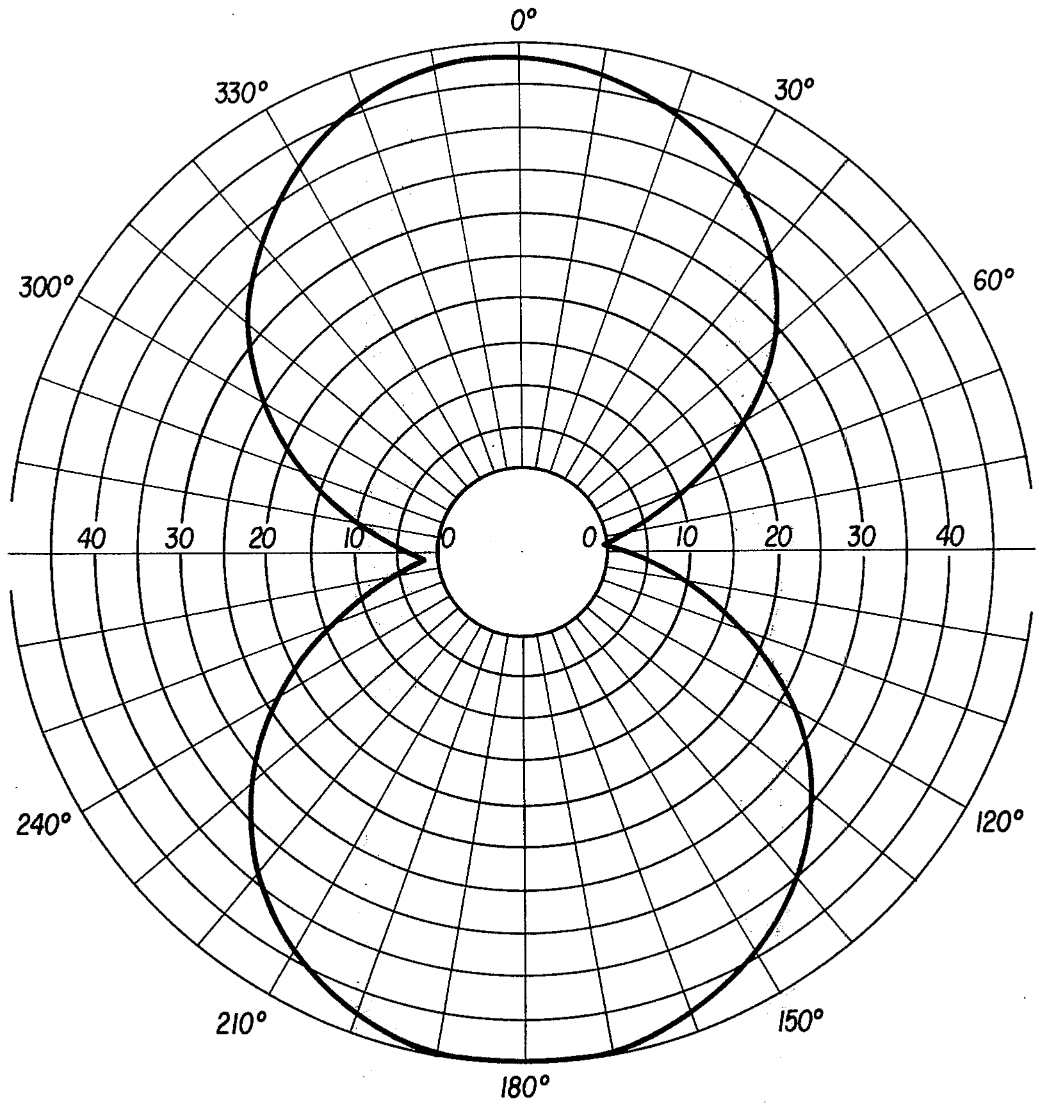

FIG. 6 represents these same sensitivity lobes measured for a frequency of 30 KHZ. For intermediate frequencies, the same shape of the directivity lobes is obtained. These diagrams clearly demonstrate the excellent directivity of the hydrophones of the invention over a very wide band of acoustic frequencies.

Tests were performed to measure the influence of a thermal shock on hydrophones made according to the invention.

After having been subjected for about an hour to a temperature of −25° C, the hydrophones were suddenly brought back to ambient temperature. After waiting about 15 minutes for the temperature of the hydrophones to stabilize, sensitivity tests were made which showed that it had not varied to a perceptible degree.

A specific application of hydrophones built according to the invention is to equip listening buoys immersed at sea in order to reveal the presence and the direction of a sound-source. These hydrophones are quite suited to this application because of: their reduced size which allows them to be placed in small-volume buoys; their good sensitivity in a frequency band involving the usual sound frequencies; their good resistance to immersion and to large hydrostatic pressures due to their elastomeric coating; and their insensitivity to low temperatures and to thermal shocks which buoys cast from planes can be exposed to.

Laboratory tests were made to test the pressure resistance of hydrophones build according to this invention. These tests have shown a good resistance to pressures of up to 300 bars.

Evidently, several modifications can be brought about by the man of art to the hydrophone which has just been described without departing from the scope of this invention. Namely, the dimensions and nature of the materials used may vary.

What I claim is:

1. A bidirectional flexion-plate hydrophone comprising:

only a single flexible cicular membrane of substantially constant thickness, two rigid rings enclosing the periphery of said membrane, a piezoelectric disc on at least one face of said membrane, the exterior diameter of which is smaller than the interior diameter of said rigid rings wherein said membrane, said rings and said discs being completely embedded in an elastomeric material forming a unit attached to a rigid support only through said elastomeric material.

2. A hydrophone as claimed in claim 1, wherein:

the elastomeric material covering the side of the membrane facing the disc has a uniform thickness which is less than that on other portions of the hydrophone.

3. A hydrophone as claimed in claim 2, wherein:

the thickness of the elastomeric material covering the side of the membrane facing the disc is between 0.5 mm and 2 mm.

4. A hydrophone as claimed in claim 3, wherein:

said rings have an interior diameter of approximately 24 mm, and said thickness is approximately 1 mm.

5. A hydrophone as claimed in claim 4, wherein:

the elastomeric material is polyurethane.

6. A hydrophone as claimed in claim 1, wherein:

the disc is lead titanium zirconate ceramic.

7. A bidirectional flexion-plate hydrophone for attachment to a rigid support and for receiving acoustic waves with good sensitivity and directivity over the band of sonic frequencies, comprising:

only a single flexible circular membrane of substantially constant thickness, two rigid rings enclosing the periphery of said membrane, a piezoelectric disc on at least one face of said membrane, the outer diameter of which is smaller than the inner diameter of said rigid rings, wherein said membrane, said rings and said discs are embedded in an elastomeric material coating which comprises on each face a central acoustically transmissive window, with a smaller uniform thickness, and a circular thicker rim surrounding said window.

8. A hydrophone as claimed in claim 7 wherein:

the elastomeric material each acoustically transmissive window has a uniform thickness of between 0.5 mm and 2 mm which is less than that on other portions of the hydrophone.

9. A bidirectional flexion plate hydrophone for attachment to a rigid support and for receiving acoustic waves with good sensitivity and directivity over the band of sonic frequencies, comprising:

only one single flexible circular metallic membrane of substantially uniform thickness, two rigid rings directly contacting the periphery of said membrane without any elastomeric material between said rings and said membrane, a piezoelectric disc on each face of said membrane, the exterior diameter of which is smaller than the interior diameter of said rigid rings, wherein said membrane, said rings and said discs are completely embedded in an elastomeric material coating which comprises contiguous to each disc a central circular acoustically transmissive window of reduced uniform thickness, facing said piezoelectric discs, and a thicker rim, surrounding said window and enclosing said rings, wherein rigid means for securing said hydrophone to a rigid support is embedded in said coating, said elastic material coating forming the only connection between said rigid means and said rings.

10. A hydrophone as claimed in claim 9 wherein each window is exposed for operative communication of sound from the exterior of the hydrophone.

* * * * *